United States Patent

Van Doorn et al.

[11] Patent Number: 5,871,873
[45] Date of Patent: Feb. 16, 1999

[54] METHOD OF MANUFACTURING A COLOR DISPLAY DEVICE COMPRISING COLOR-FILTER LAYERS

[75] Inventors: Arie R. Van Doorn; Godefridus P. Van Melis, both of Eindhoven, Netherlands

[73] Assignee: U.S. Philips Corporation, New York, N.Y.

[21] Appl. No.: 950,568

[22] Filed: Oct. 15, 1997

[30] Foreign Application Priority Data

Oct. 17, 1996 [EP] European Pat. Off. ............. 96202891

[51] Int. Cl.⁶ ..................................................... G02B 5/20
[52] U.S. Cl. ................... 430/27; 430/24; 430/25
[58] Field of Search ................ 430/25, 27, 24, 430/7

[56] References Cited

U.S. PATENT DOCUMENTS

| | | | |
|---|---|---|---|
| 4,268,594 | 5/1981 | Gesswein et al. | 430/27 |
| 5,476,737 | 12/1995 | Kusunoki et al. | 430/27 |
| 5,700,609 | 12/1997 | Matsuda et al. | 430/27 |

*Primary Examiner*—John A. McPherson
*Attorney, Agent, or Firm*—John C. Fox

[57] ABSTRACT

In the manufacture of a color-display device comprising color-filter layers, phosphor haze may occur. Said phosphor haze adversely affects the picture quality. Phosphor haze can be reduced substantially, or precluded, by providing one, and only one, of the color-filter layers by means of a negative lithography process and, subsequently, providing the phosphor corresponding to this color-filter layer before the other phosphor layers.

2 Claims, 5 Drawing Sheets

METHOD OF MANUFACTURING A COLOR DISPLAY DEVICE COMPRISING COLOR-FILTER LAYERS

CROSS-REF TO RELATED APPLICATIONS

U.S. patent applications Ser. No. 08/950,570, filed Oct. 15, 1997 and Ser. No. 08/950,568, filed Oct. 15, 1997 (PHN 16027) also relate to color display devices having color filter layers.

BACKGROUND OF THE INVENTION

The invention relates to a method of manufacturing a color display device comprising a substrate on which a black-matrix layer having apertures is provided, said color display device having a phosphor pattern for the emission, in operation, of light through the apertures in the black-matrix layer, and more than one color-filter layer extending between the phosphor pattern and the substrate.

Color display devices of the type mentioned in the opening paragraph are used, inter alia, in television receivers and computer monitors.

A color display device of the type mentioned in the opening paragraph is known. Said known color display device comprises a phosphor pattern which includes sub-patterns of phosphor regions luminescing red, green and blue light (hereinafter also referred to as "red", "green" and "blue" phosphors) and it further comprises a black matrix. A black-matrix layer is a black layer provided with apertures or a system of black stripes on the substrate and (in part) between the phosphor regions of which the phosphor pattern is made up, which black-matrix layer improves the contrast of the picture displayed. The black matrix is provided with apertures in which colored layers (also referred to as color-filter layers) are provided, and a phosphor region of a corresponding color is deposited on said colored layers. The color-filter layer absorbs incident light of different wavelengths than the light emitted by the relevant phosphor. This leads to a reduction of the diffuse reflection of incident light and to an improved contrast of the picture displayed. In addition, the color-filter layer (for example a "red" layer) may absorb a part of the radiation emitted by the "red" phosphor, namely the part having wavelengths outside the red portion of the visible spectrum. By virtue thereof, the color point of the red phosphor is improved. The known color display device comprises a color-filter layer for each of the phosphors (red, green and blue). For clarity, it is observed that "red", "blue" and "green" color-filter regions have a relatively high transmission for, respectively, red, blue and green light. The color indication for the color-filter layers relates to the transmission properties of the filters, not to their color.

The known color display device has a number of shortcomings, in articular phosphor haze, which is a phenomenon which is characterized in that phosphor particles of a specific color are situated in regions intended for another phosphor, forms a problem. Phosphor haze adversely affects the quality of the picture displayed.

OBJECTS AND SUMMARY OF THE INVENTION

It is an object of the invention to provide a method of manufacturing a color display device of the type mentioned in the opening paragraph, in which the above-mentioned problem is reduced.

To this end, a method of manufacturing a cathode ray tube in accordance with the invention is characterized in that one, and only one, color-filter layer is provided by means of a negative lithography process, and that, during the provision of the phosphors, the phosphor whose color corresponds to the color of the color-filter layer provided by means of said negative lithography process is provided as the first phosphor layer.

A negative lithography process is a process in which a photosensitive layer is provided on a surface and exposed at locations where the presence of the layer is required, whereafter the unexposed portions are removed. A negative lithography process is a method of providing a patterned layer. Within the scope of the invention, it has been found that the negative lithography process can suitably be used to provide one color-filter layer. However, phosphor haze occurs if more than one color-filter layer is provided by means of a negative lithography process.

Preferably, a blue color-filter layer is provided by means of a negative lithography process.

These and other aspects of the invention will be apparent from and elucidated with reference to the embodiments described hereinafter.

BRIEF DESCRIPTION OF THE DRAWINGS

In the drawings.

The Figures are not drawn to scale. In general, like reference numerals refer to like parts.

DESCRIPTION OF THE PREFERRED EMBODIMENTS

Figure 1:
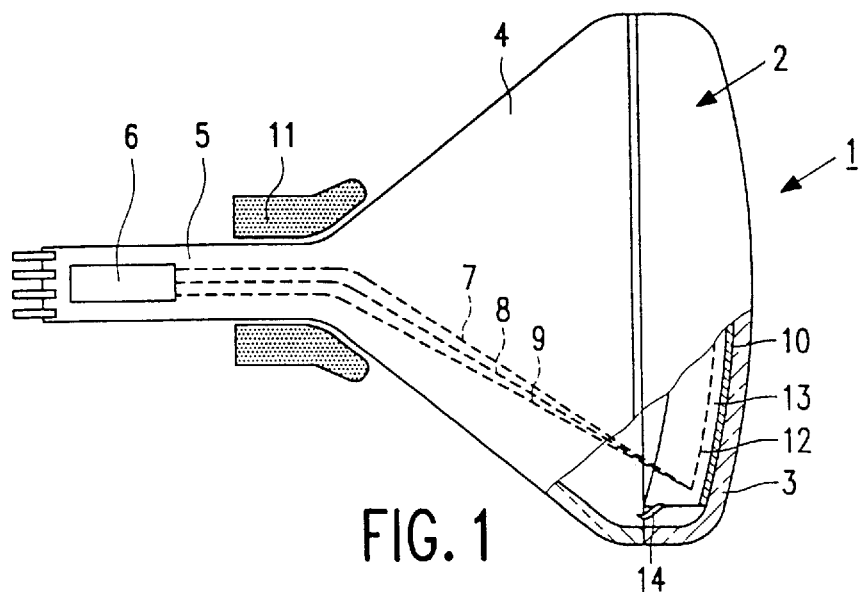
FIG. 1 is a sectional view of a display tube.

A color display tube 1 (FIG. 1) comprises an evacuated envelope 2 including a display window 3, a cone portion 4 and a neck 5. In the neck 5 there is arranged an electron gun 6 for generating three electron beams 7, 8 and 9. A display screen 10 is provided on the inner surface of the display window. Said display screen 10 comprises a phosphor pattern of phosphor elements luminescing in red, green and blue. On their way to the display screen 10, the electron beams 7, 8 and 9 are deflected across the display screen 10 by means of a deflection unit 11 and pass through a shadow mask 12 which is arranged in front of the display window 3 and which comprises a thin plate having apertures. The shadow mask is suspended in the display window by means of suspension means 14. The three electron beams 7, 8 and 9 pass through the apertures 13 of the shadow mask at a small angle relative to each other and, consequently, each electron beam impinges on phosphor elements of only one color.

Figure 2A:
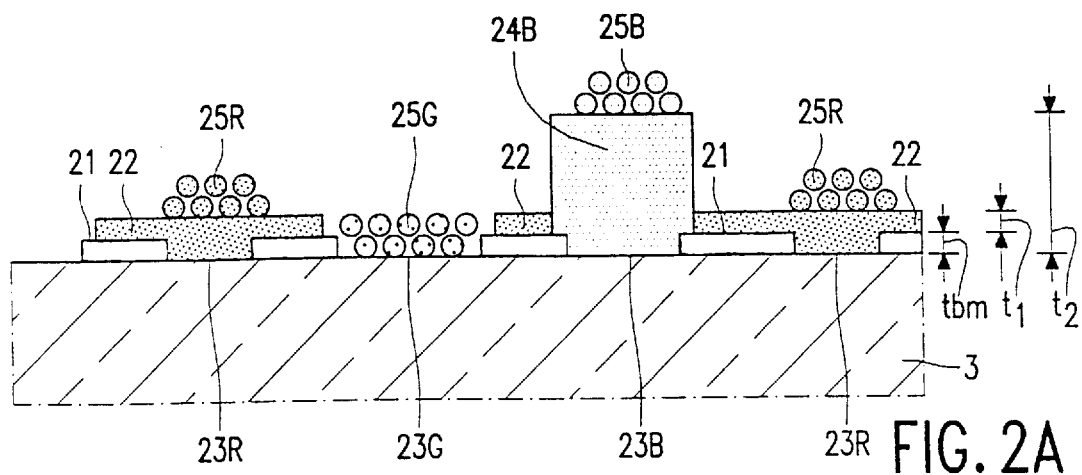
FIG. 2A is a sectional view of a display window for a display tube in accordance with the invention, which is provided with color-filter layers.
Figure 2B:
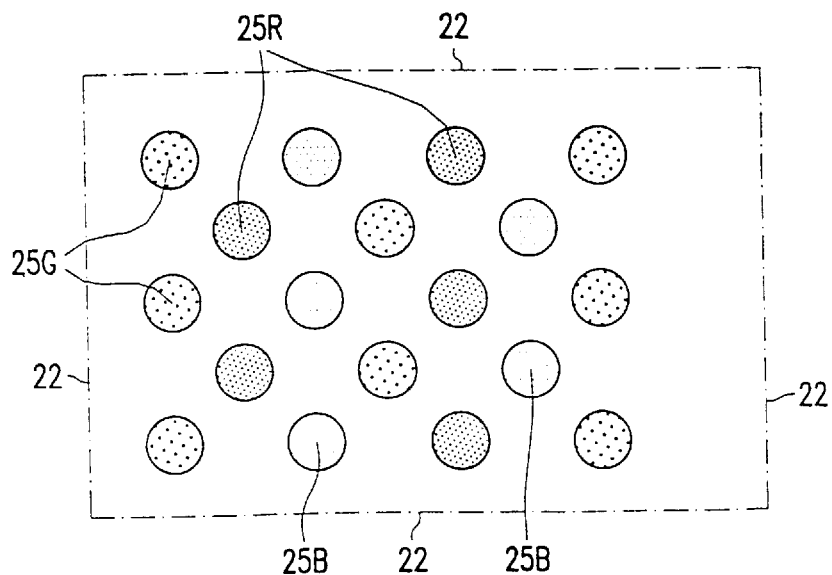
FIG. 2B is an elevational view of a display window of a display tube in accordance with the invention.

FIG. 2A is a sectional view of a display window of a color cathode ray tube in accordance with the invention. FIG. 2B is an elevational view (on the phosphor elements) of the display window shown in FIG. 2A. A black matrix 21 is provided on the inner surface of the display window. Color-filter layer 22 extends over apertures 23R for R (red)

phosphor elements and over the black matrix 21, with the exception of the apertures 23B, 23G for, respectively, the B (blue) and C (green) phosphor elements. Regions of the color-filter layer 24B are provided in the apertures 23B. Said regions of the color-filter layer 24B project above the black matrix. In this example, the thickness $t_2$ of the color-filter layer 24B is 1.5–5 μm. Phosphors 25R, 25G and 25B are provided above the apertures 23R, 23G and 23B, respectively, with the color-filter layers, if any, extending between the phosphors and the substrate.

An example of a method of providing more than one color-filter layer, in which case phosphor haze occurs, is schematically shown in FIGS. 3A through 3G.

Figure 3A:
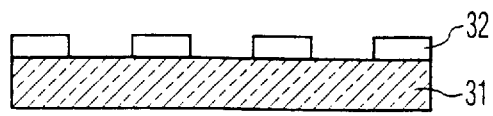
FIGS. 3A through 3G and 4A through 4G show methods of providing two color-filter layers by means of a negative lithography process.

A. Application of a black matrix 32 to a substrate 31; this operation can be carried out by means of known methods (FIG. 3A).

Figure 3B:
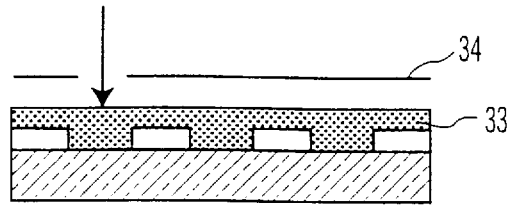

B. Application of a photosensitive layer containing a red dye 33 to the substrate, and exposure of the layer 33 through a mask 34 (FIG. 3B).

Figure 3C:
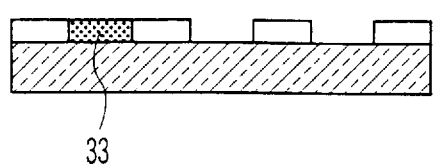

C. Removal of the unexposed photosensitive layer (FIG. 3C).

Figure 3D:
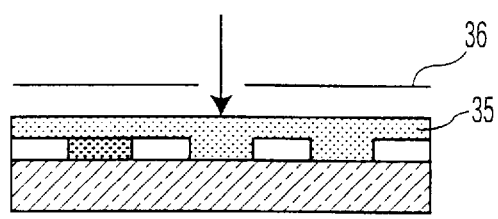

D. Application of a photosensitive layer 35 containing a blue dye 33 to the substrate and exposure of the layer 35 through a mask 36 (FIG. 3D).

Figure 3E:
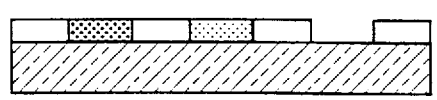

E. Removal of the unexposed photosensitive layer (FIG. 3E).

F. Provision of a photosuspension 37 containing blue-luminescent phosphors.

Figure 3F:
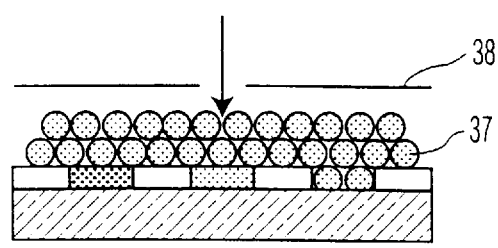

Exposure of the layer 37 through a mask 38 (FIG. 3F). Removal of unexposed regions.

G. The final result.

Figure 3G:
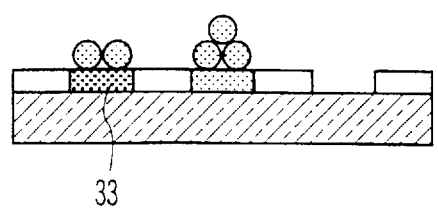

Although the layer 37 is not exposed above the "red" regions 33 and hence no "blue" phosphors should be left on the "red" color regions, it has been found, within the scope of the invention, that this undesirable phenomenon does occur. FIG. 3G shows that a layer of blue phosphor particles are left behind on the "red" regions 33. These blue phosphor particles cause color contamination because electrons which are incident on a "red" phosphor region also produce a quantity of "blue" light.

Figure 4A:
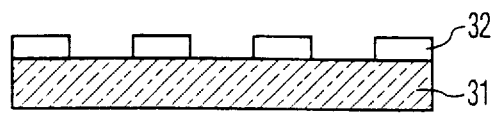
Figure 4B:
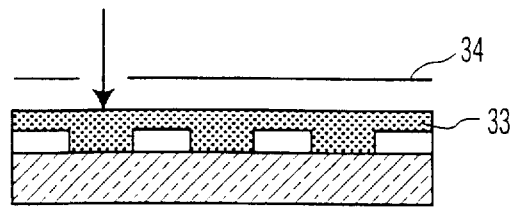
Figure 4C:
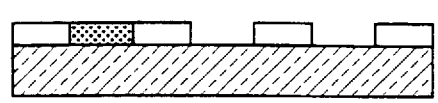
Figure 4D:
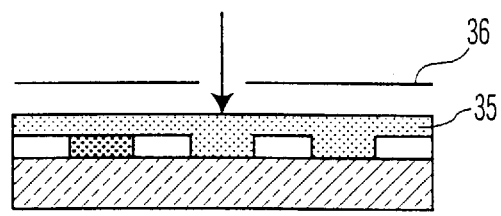
Figure 4E:
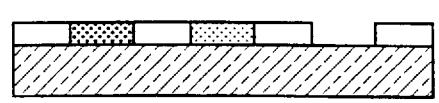
Figure 4F:
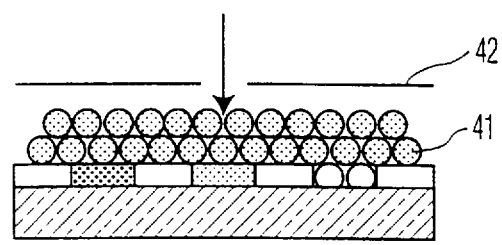
Figure 4G:
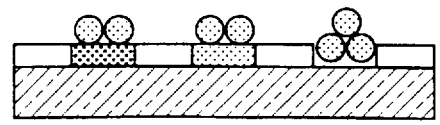

FIGS. 4A through 4E correspond to FIGS. 3A through 3E. FIG. 4F shows the provision of a photosuspension 41 containing green-luminescent phosphors. After removing the unexposed parts of the layer 41, green phosphor particles are left behind on the blue and red color-filter layers (see FIG. 4G), causing color contamination.

Figure 5A:
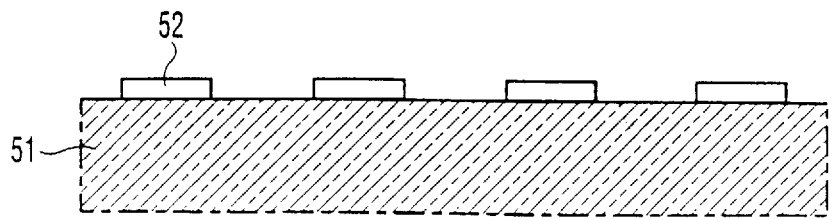
FIGS. 5A through 5J show a method of manufacturing a color display device in accordance with the invention.
Figure 5B:
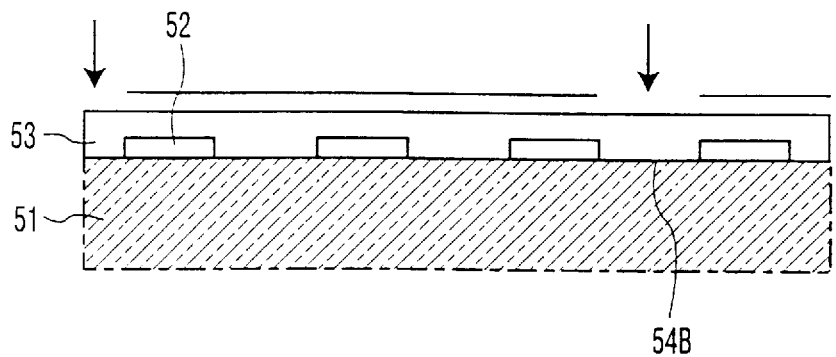
Figure 5C:
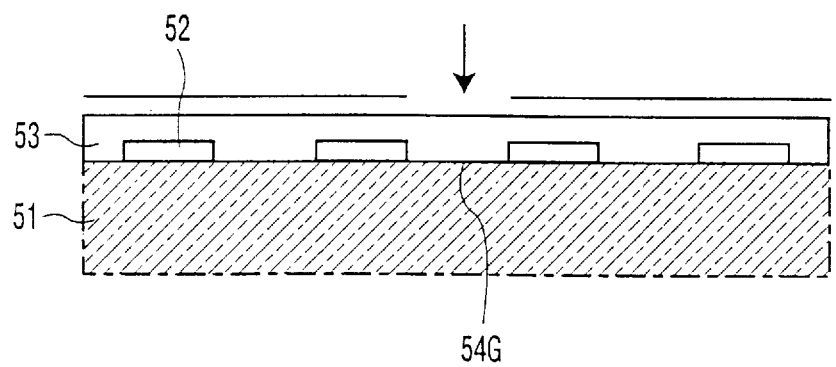
Figure 5D:
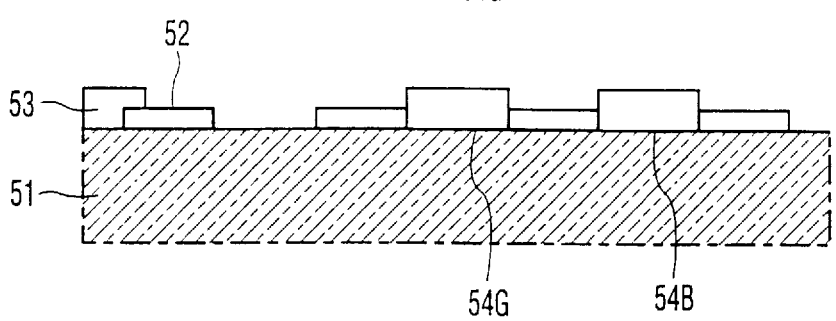
Figure 5E:
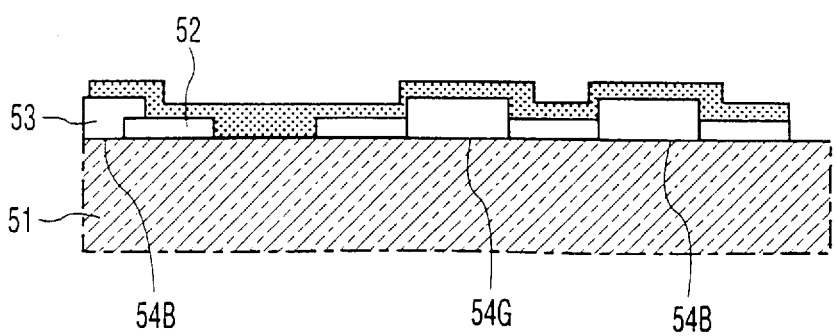
Figure 5F:
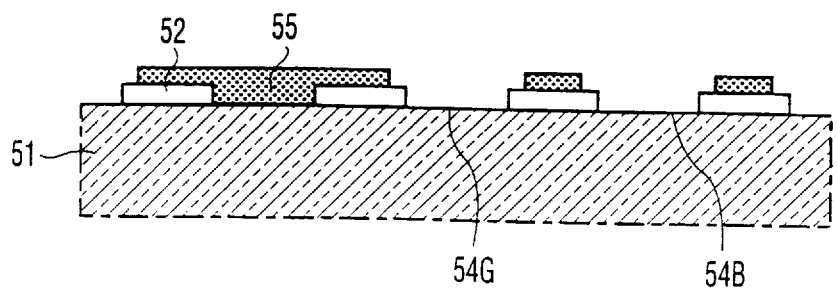
Figure 5G:
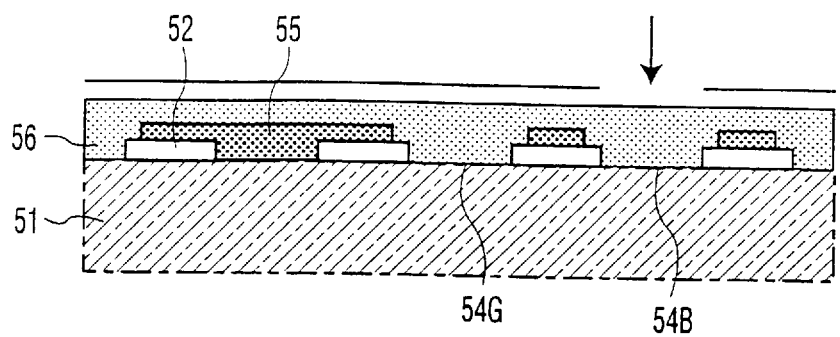
Figure 5H:
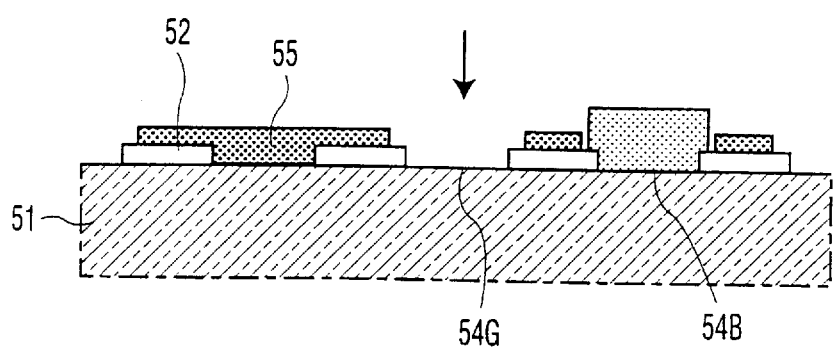

An example of a number of process steps of a method for the manufacture of the color-display device in accordance with the invention is illustrated in FIGS. 5A through 5J. Said method comprises the following process steps.

a. Application of a black matrix 52 to a substrate 51; this operation can be carried out by means of known methods (FIG. 5A).

b. Application of a layer of a photoresist 53 to the substrate, exposure of said photoresist in and around the apertures 54B and 54G in the black matrix. Said exposure is preferably carried out such that the exposed regions overlap the apertures in the black matrix and an edge around said apertures (FIGS. 5B and 5C).

c. Removal of the unexposed photoresist (FIG. 5D).

d. Application of a suspension 55 containing a first, for example red, dye. Drying the suspension (FIG. 5E).

e. Removal of the photoresist along with the dried suspension present on said photoresist (FIG. 5F), in this example, by a so-called "lift-off process".

f. Provision of a photoresist suspension 56 containing a second, for example blue, dye. Exposure of the suspension through the mask (FIG. 5G).

g. Removal of the unexposed suspension 56. In this example, the thickness of the suspension 56 is such that the exposed (blue) color-layer regions project above the black matrix (FIG. 5H). Process steps f and g together form the "negative lithography process" or "negative litho-process", for short.

i. Provision of a photosuspension 57 containing blue luminescent phosphors.

Figure 5I:
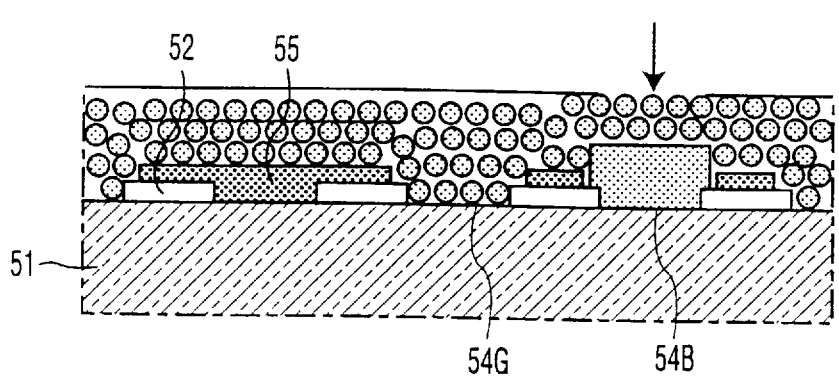
Figure 5J:
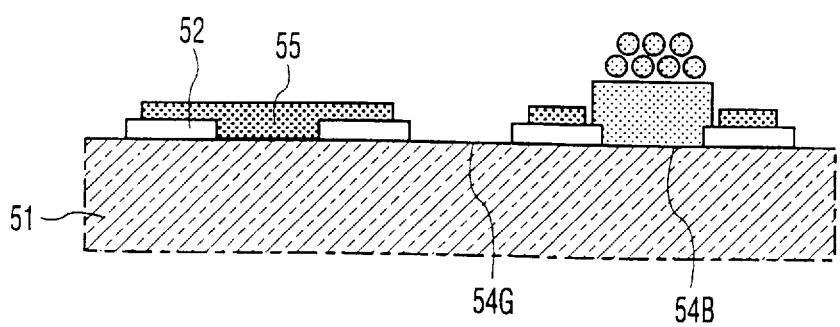

Exposure of said photosuspension (FIG. 5I). The blue-luminescent phosphors which are provided on top of the blue color filter regions 54B prevent green and red phosphor particles from adhering to the blue color-filter regions.

Subsequently, the other phosphors are provided by means of known techniques.

The inventors have recognized that the method in accordance with the invention leads to a substantial reduction of phosphor haze. Measurements have confirmed that the contrast of the picture reproduction is not noticeably improved by the application of a "green" color-filter layer. For example: the application of only a red color-filter layer leads to an increase of the contrast by approximately 7% relative to a color-display device without color-filter layers; the application of a red and a blue color-filter layer leads to an increase of the contrast by approximately 21%; the application of three (red, blue and green) color-filter layers leads to an increase in contrast by approximately 22%. Therefore, the surprising conclusion can be drawn that the provision of a green color-filter layer hardly influences the contrast. Apart from positive effects, however, the color-filter layers also have negative effects, i.e. they cause additional costs and a greater complexity of the method. Since each process step may be a source of rejects, color-filter layers lead to an increase in the number of rejects.

The red color-filter layer is very suitable for a so-called "lift-off process" and, in a preferred embodiment of the invention, the first color-filter layer is a red color-filter layer. Preferably, the following relationship applies:

$$|t_1 + t_{BM} - t_2| \leq |t_2 - t_{BM}|$$

wherein $t_1$ is the thickness of the first color-filter layer or the black-matrix layer 22, $t_{BM}$ is the thickness of the black matrix and $t_2$ is the thickness of the second color-filter layer.

This preferred embodiment of the invention has the advantage that the color-filter regions projecting above the black matrix have a negative effect on the flow behavior of the phosphor suspension(s) (37) when said phosphor suspension(s) is (are) provided. Depending on the pattern, regions comprising more or less (than average) of the phosphor suspension are formed in the display window. Eventually, this leads to the formation of clear and dark regions or stripes on the picture displayed. In the cathode ray tube in accordance with this preferred embodiment of the invention, the first color-filter layer is provided on the black matrix, so that the second color-filter layer projects less above its surroundings. As, in the preferred embodiment of the invention, the (red) color-filter layer 22 also extends over the black matrix between the (blue) regions of the color-filter layer, the differences in height are reduced. The thickness $t_{BM}$ of the black matrix is, for example, 0.5–0.7 micrometer, the thickness $t_1$ of the red color-filter layer 22 is 0.5–0.7 micrometer and the thickness $t_2$ of the blue color-filter layer 24B is 1.5–2.5 micrometers. By virtue of the presence of the red color-filter layer 22 around the blue regions of the color-filter layer 24B, the height of the regions 24B relative to the direct surroundings, i.e. how far these regions project above the surroundings, is reduced by 30 to 50%. This results in an improved homogeneity of the phosphor coating. FIG. 2A also shows an aspect of a preferred embodiment of the invention, namely that an edge around the apertures 23B in the black matrix 21 is left free by the color-filter layer 22. By virtue thereof, "red" color-filter material is prevented from entering the apertures 23B and/or 23G. This results in an improved color reproduction.

The invention can be summarized as follows:

in the manufacture of a color-display device comprising color-filter layers, phosphor haze may occur. Said phosphor haze adversely affects the picture quality. Phosphor haze can be reduced substantially, or precluded, by providing one, and only one, of the color-filter layers by means of a negative lithography process and, subsequently, providing the phosphor corresponding to this color-filter layer before the other phosphor layers.

A negative lithography process is a process in which a photosensitive layer is exposed and the exposed portions of the layer are not removed.

It will be obvious that the invention is not limited to the examples described hereinabove. For example, in FIG. 1 a conventional color-cathode ray tube is shown. Within the scope of the invention, the term "color-display device" should be interpreted in a broad sense so as to include any display device comprising a pattern of phosphors in three luminescent phosphors on a substrate. Color display devices include flat display devices of various types, such as plasma displays. Materials which can be used for the color filters are e.g. ironoxide for red color filters, cobalt aluminate for blue color filters and Co O.NiO.TiO$_2$.InO for green color filters.

We claim:

1. A method of manufacturing a color display device comprising a substrate on which a black-matrix layer having apertures is provided, said color display device having a phosphor pattern for the emission, in operation, of light through the apertures in the black-matrix layer, and more than one color-filter layer extending between the phosphor pattern and the substrate, characterized in that one, and only one, color-filter layer is provided by means of a negative lithography process, and that, during the provision of the phosphors, the phosphor whose color corresponds to the color of the color-filter layer provided by means of said negative lithography process is provided as the first phosphor layer.

2. A method as claimed in claim 1, characterized in that a blue color-filter layer is provided by means of a negative lithography process.

* * * * *